United States Patent
Kim

(10) Patent No.: US 11,706,732 B2
(45) Date of Patent: *Jul. 18, 2023

(54) METHOD AND APPARATUS FOR CONTROLLING UE FOR CELLULAR IOT SERVICE IN 5G MOBILE COMMUNICATION SYSTEM

(71) Applicant: Samsung Electronics Co., Ltd., Suwon-si (KR)

(72) Inventor: Sunghoon Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/556,794

(22) Filed: Dec. 20, 2021

(65) Prior Publication Data

US 2022/0116900 A1    Apr. 14, 2022

Related U.S. Application Data

(63) Continuation of application No. 16/792,001, filed on Feb. 14, 2020, now Pat. No. 11,206,629.

(30) Foreign Application Priority Data

Feb. 15, 2019  (KR) .................. 10-2019-0017623
Jul. 26, 2019  (KR) .................. 10-2019-0090672

(51) Int. Cl.
*H04W 60/02*    (2009.01)
*H04W 8/24*    (2009.01)
(Continued)

(52) U.S. Cl.
CPC ............. *H04W 60/02* (2013.01); *H04W 8/08* (2013.01); *H04W 8/24* (2013.01); *H04W 48/16* (2013.01)

(58) Field of Classification Search
CPC ......... H04W 60/02; H04W 8/08; H04W 8/24; H04W 48/16; H04W 4/70; H04W 52/0216; H04W 60/04; Y02D 30/70
See application file for complete search history.

(56) References Cited

U.S. PATENT DOCUMENTS 11,122,402 B2 *  9/2021  Lee ..................... H04W 64/003
11,129,213 B2 *  9/2021  Vaidya ................. H04W 24/02
(Continued)

FOREIGN PATENT DOCUMENTS

EP        3579656 A1        12/2019
KR    10-2018-0103655 A     9/2018

OTHER PUBLICATIONS

International Search Report dated May 20, 2020. in connection with International Patent Application No. PCT/KR2020/002103, 3 pages.

(Continued)

*Primary Examiner* — Julio R Perez

(57) ABSTRACT

A method performed by an access and mobility management function (AMF), the method comprising receiving, from a User Equipment (UE), a first message including capability information related to a periodic registration timer, setting a periodic registration timer indication based on the capability information, and transmitting, to the UE, a second message including the periodic registration timer indication.

20 Claims, 6 Drawing Sheets

(51) Int. Cl.
*H04W 8/08* (2009.01)
*H04W 48/16* (2009.01)

(56) References Cited

U.S. PATENT DOCUMENTS

| | | | | |
|---|---|---|---|---|
| 11,134,436 | B2* | 9/2021 | Yang | H04W 36/0022 |
| 2018/0368094 | A1* | 12/2018 | Deaconu | H04W 60/04 |
| 2019/0182897 | A1* | 6/2019 | Jain | H04W 4/80 |
| 2019/0387490 | A1* | 12/2019 | Li | H04W 8/02 |
| 2020/0053818 | A1* | 2/2020 | Sillanpaa | H04W 76/27 |
| 2020/0112921 | A1* | 4/2020 | Han | H04W 76/27 |
| 2020/0205097 | A1* | 6/2020 | Wu | H04W 60/04 |
| 2020/0389864 | A1* | 12/2020 | Ramle | H04W 60/04 |
| 2020/0396598 | A1* | 12/2020 | Guo | H04W 12/08 |
| 2021/0058851 | A1* | 2/2021 | Hua | H04W 8/08 |
| 2021/0068067 | A1* | 3/2021 | Natarajan | H04W 60/02 |
| 2021/0168705 | A1* | 6/2021 | Fiorese | H04W 12/037 |
| 2021/0289340 | A1* | 9/2021 | Lee | H04W 60/00 |
| 2021/0297977 | A1* | 9/2021 | Prabhakar | H04W 60/00 |
| 2021/0306806 | A1* | 9/2021 | Dang | H04W 76/11 |

OTHER PUBLICATIONS

3GPP TR 23.724 V16.0.0 (Dec. 2018), 3rd Generation Partnership Project; Technical Specification Group Services and System Aspects; Study on Cellular Internet of Things (IoT) support and evolution for the 5G System (Release 16), Dec. 2018, 277 pages.

Huawei, et al., "Solution for Kl#4: MICO Mode Management for Expected Application Behaviour," S2-183725, 3GPP TSG-SA WG2 Meeting #127, Apr. 16-20, 2018, 6 pages.

Oppo, "Update for solution 9: Enhanced MICO mode with Active Time," S2-184792, SA WG2 Meeting #127, May 28-Jun. 1, 2018, 4 pages.

Samsung Electronics, "MICO mode parameter optimization for mIoT terminals," S2-1900406, 3GPP TSG-SA WG2 Meeting #130, Jan. 21-25, 2019, 4 pages.

Supplementary European Search Report dated Feb. 14, 2022, in connection with European Application No. 20755755.4, 17 pages.

3GPP TS 23.501 Draft V16.0.0+ (Feb. 2019), Technical Specification, 3rd Generation Partnership Project; Technical Specification Group Services and System Aspects; System Architecture for the 5G System; Stage 2 (Release 16), Feb. 2019, 281 pages.

Huawei, et al., "Solution for Kl#4: MICO Mode Management for Expected Application Behaviour," S2-181960 (revision of S2-18xxxx), 3GPP TSG-SA WG2 Meeting #126, Montreal, Canada, Feb. 26-Mar. 2, 2018, 6 pages.

Samsung, 5G CIoT: Clarification on strictly periodic registration timer, S2-1901929, 3GPP TSG SA WG2 #131, Santa Cruz, Tenerife, Spain, Feb. 25-Mar. 1, 2019, 3 pages.

* cited by examiner

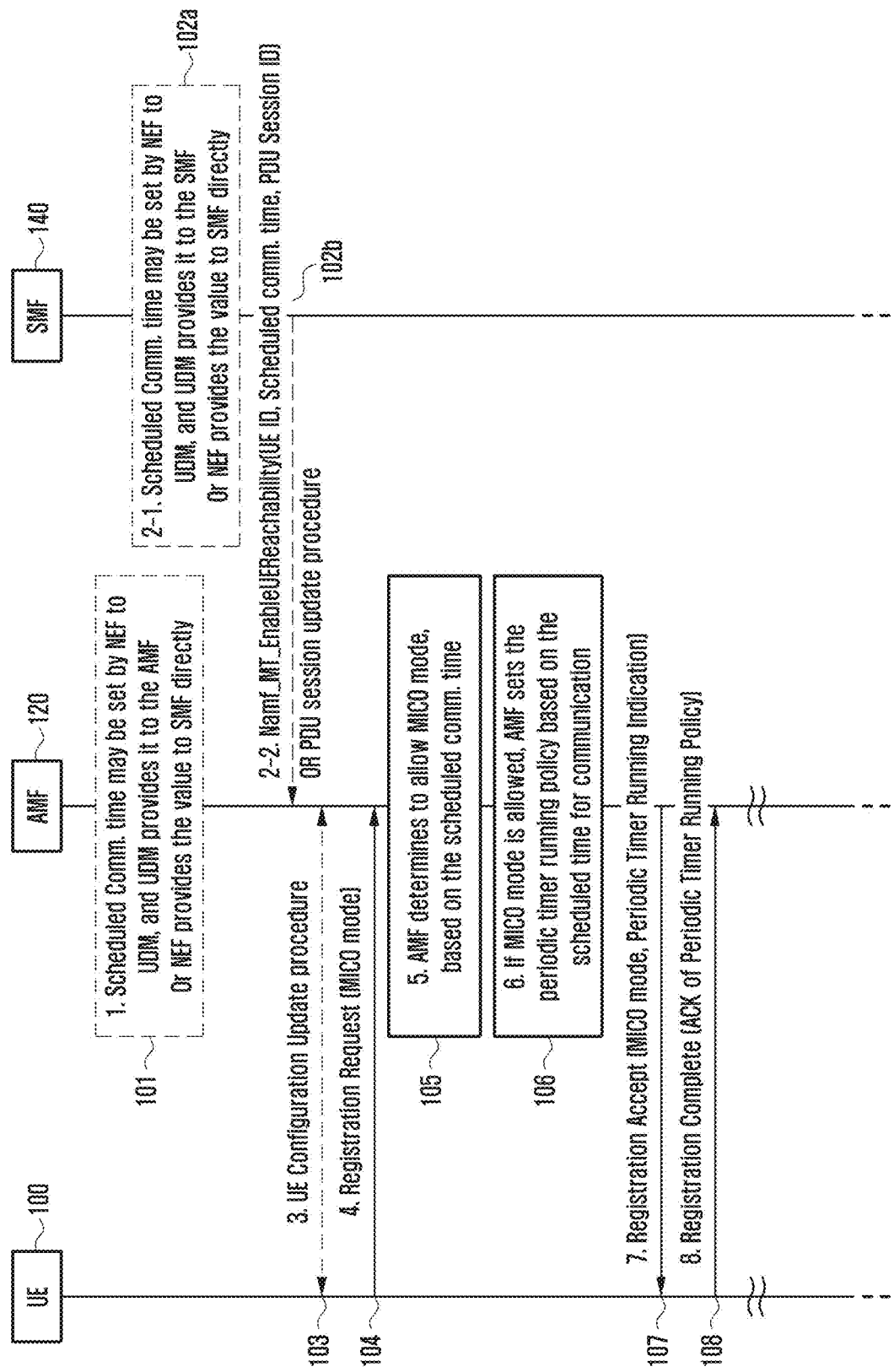

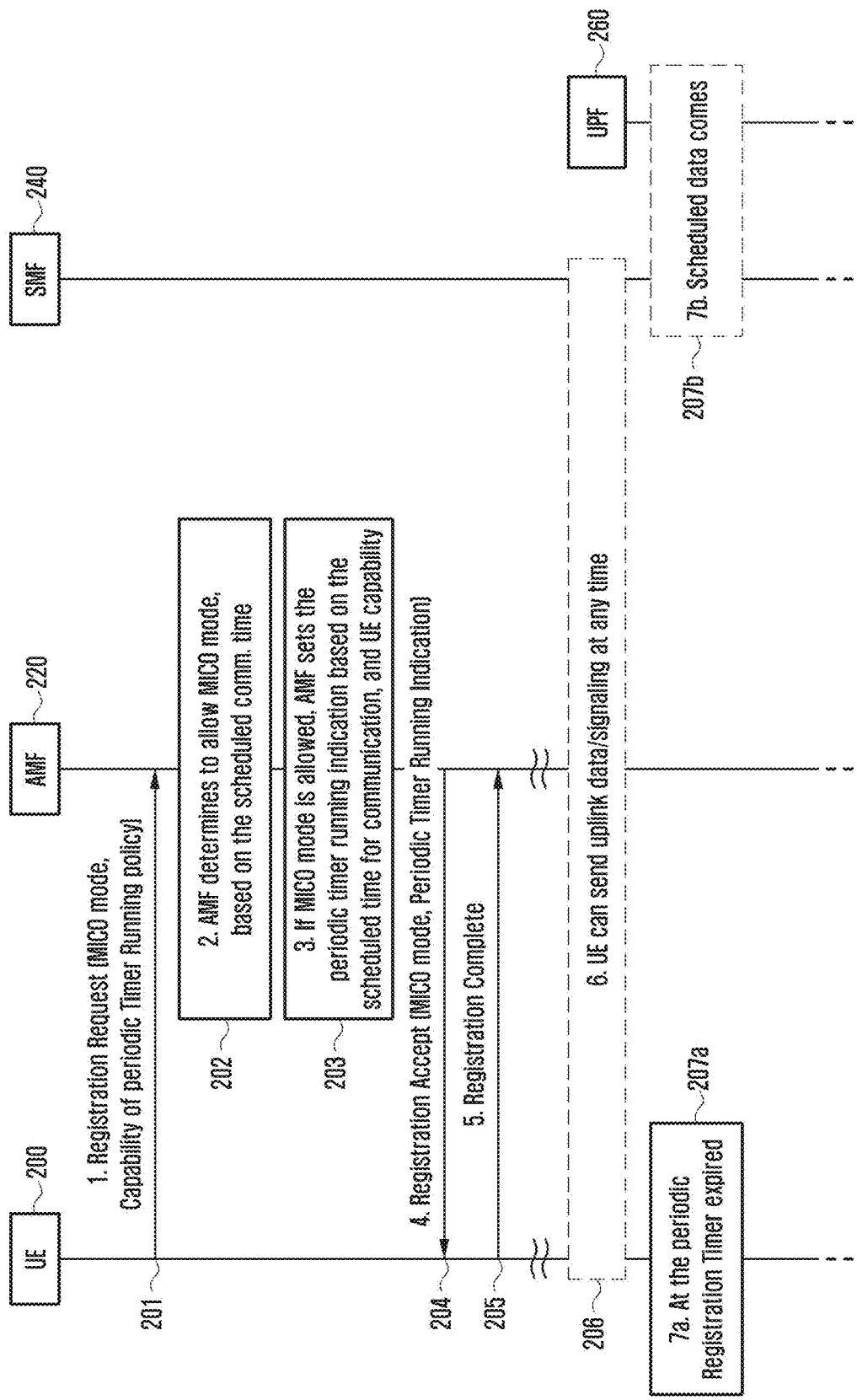

METHOD AND APPARATUS FOR CONTROLLING UE FOR CELLULAR IOT SERVICE IN 5G MOBILE COMMUNICATION SYSTEM

CROSS-REFERENCE TO RELATED APPLICATIONS

This application is a continuation of application Ser. No. 16/792,001, filed Feb. 14, 2020, now U.S. Pat. No. 11,206,629, which is based on and claims priority under 35 U.S.C. 119 to Korean Patent Application No. 10-2019-0017623, filed Feb. 15, 2019 and Korean Patent Application No. 10-2019-0090672, filed Jul. 26, 2019 in the Korean Intellectual Property Office, the disclosures of which are herein incorporated by reference in their entireties.

BACKGROUND

1. Field

In the detailed description of embodiments of the disclosure, a radio access network of which the 5G network standard is defined by $3^{rd}$ generation partnership projection (3GPP), new RAN (NR) corresponding to a core network, and a packet core (5G system, 5G core network, or NG core (next generation core)) will be mainly discussed, but the main subject of the disclosure with a slight change can be applied to other communication systems having a similar technical background within a range without departing from the scope of the disclosure, which can be made by the determination of a person skilled in the art.

A CIoT service of the 5G system may support a function in which a UE transmits data to a core network through a non access stratum (NAS) message and the core network transmits the data to an external data network and a function in which data transmitted by the UE is transferred to an external server through a network exposure function (NEF).

Further, the 5G system may provide a service for factory automation, which may be called industrial IoT. Robots and other equipment used for factory automation may communicate through a cellular network and may belong to IoT equipment in a wide range. Such devices require data communication sensitive to time. For example, the device should transmit status information and a command message to another device through a network within 10 ms and may be configured to provide or receive required status information at a specific time.

For convenience of description, the disclosure uses terms and names defined in the 3rd-generation partnership project long-term evolution (3GPP LTE) standard. However, the disclosure is not limited to the terms and names, but may be equally applied to a system following another standard.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described big data processing technology may also be considered to be as an example of convergence between the 5G technology and the IoT technology.

With the recent development of long-term evolution (LTE) and LTE-advanced, a method and an apparatus for efficiently controlling a UE for a cellular IoT service in a 5G mobile communication system are needed.

The above information is presented as background information only to assist with an understanding of the disclosure. No determination has been made, and no assertion is made, as to whether any of the above might be applicable as prior art with regard to the disclosure.

SUMMARY

The disclosure proposes a method of supporting the following two services to support a CIoT service in a 5G mobile communication system.

In one of the IoT-related services in the 5G mobile communication system, if there are scheduled downlink data to be transmitted to a UE at a specific time, for example, at 9 a.m. Monday or at 12 a.m. every morning, a $3^{rd}$ party application server (hereinafter, referred to as an AS) may provide the corresponding schedule information to a mobile communication network, and the mobile communication network may prepare for transmission of data to the UE at the corresponding time. The mobile communication network may perform an operation of controlling the UE to be reachable at the time according to the schedule information or providing resources for data transmission. The disclosure proposes a method by which the corresponding UE maintains a connected state with the mobile communication network at the scheduled data transmission time in the mobile communication network. The method is valid for IoT UEs transitioning to a state in which the UEs cannot be reachable the mobile communication network in order to reduce power consumption. The UE performing a specific operation to reduce power consumption may be a UE which turns on a model and wakes up only when there is data to be transmitted (for example, MICO mode) or a UE which negotiates with the mobile communication network to reduce power consumption and cannot be paged by the network for a predetermined time.

In order to transmit data to the UE according to the schedule requested from the $3^{rd}$ party AS which provides an application service, the 5G system may support an operation for connecting the UE to the network at the time according to the corresponding schedule in the disclosure. Accordingly, the UE may wake up and access the network at the specific time through the access to the 3GPP network alone without any additional operation for controlling the operation of the UE.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document. Those of ordinary skill in the art should understand that in many, if not most instances, such definitions apply to prior, as well as future uses of such defined words and phrases.

BRIEF DESCRIPTION OF THE DRAWINGS

For a more complete understanding of the disclosure and its advantages, reference is now made to the following description taken in conjunction with the accompanying drawings, in which like reference numerals represent like parts:

FIGS. 1A and 1B illustrate a method by which an AMF or an SMF acquires schedule information of scheduled data transmission, triggers a registration procedure of a UE, and negotiates a policy for running a periodic registration timer with the UE through the registration procedure according to an embodiment of the disclosure;

FIGS. 2A and 2B illustrate an operation in which an AMF negotiates capability for a policy of operating a periodic registration timer with a UE through a registration procedure and a method by which the AMF or an SMF acquires schedule information for scheduled data transmission and then triggers a registration procedure of the UE according to an embodiment of the disclosure;

DETAILED DESCRIPTION

Figure 1B:
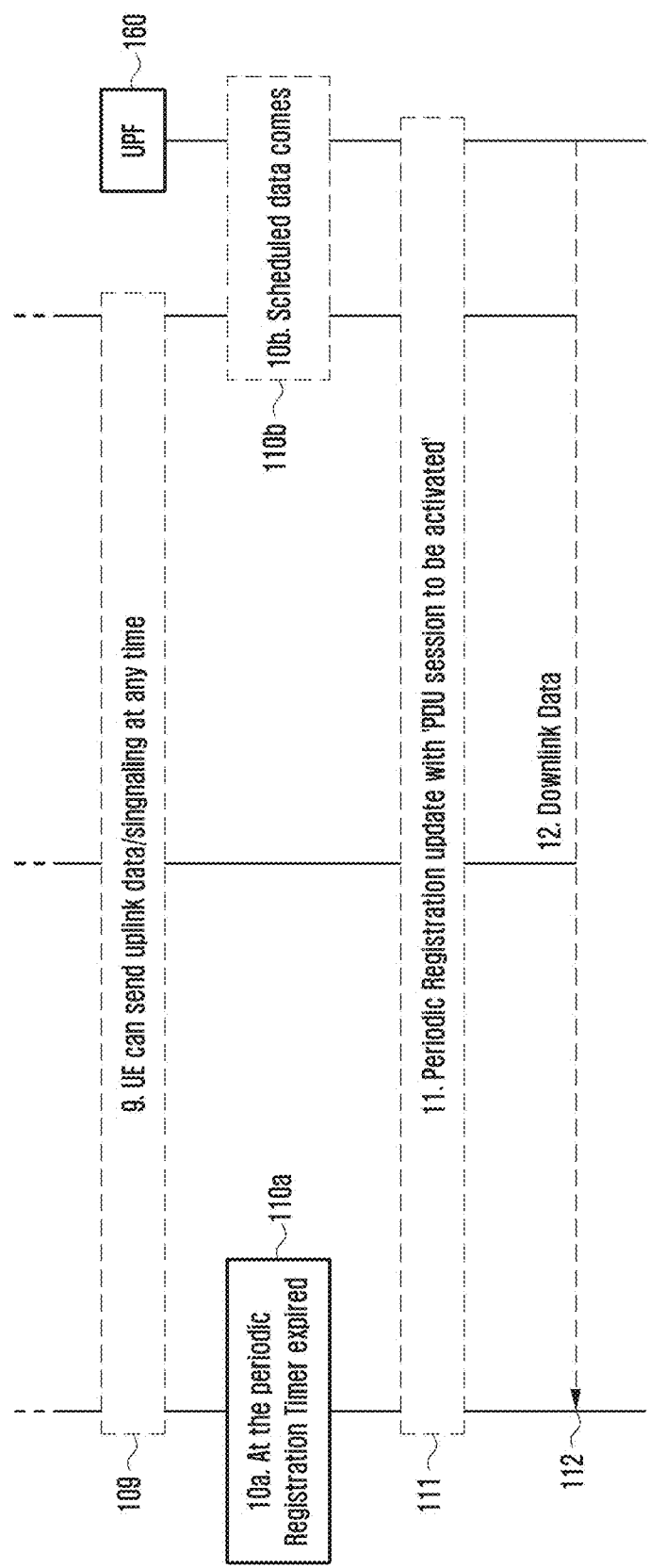

FIGS. 1A through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the disclosure will be described in detail in conjunction with the accompanying drawings. In the following description of the disclosure, a detailed description of known functions or configurations incorporated herein will be omitted when it may make the subject matter of the disclosure rather unclear. The terms which will be described below are terms defined in consideration of the functions in the disclosure, and may be different according to users, intentions of the users, or customs. Therefore, the definitions of the terms should be made based on the contents throughout the specification.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Entities in the disclosure will be described below.

A user equipment (UE) is connected to a radio access network (RAN) and accesses a device that performs a mobility management function of a core network device of 5G. In the disclosure, the device is called an access and mobility management function (AMF). This refers to a function or a device that performs both access to the RAN and mobility management of the UE. An SMF is a name of a network function corresponding to a session management function. The AMF may be connected to the SMF and may route a message related to a session for the UE to the SMF. The SMF is connected to a user plane function (UPF), allocates user plane resources to be provided to the UE, and establishes a tunnel for transmitting data between a base station and the UPF. An NRF is an abbreviation of a network repository function and corresponds to a function of storing information on NFs installed in a mobile communication service provider network and informing of the information. The NRF may be connected to all NFs, and each NF may perform a registration procedure in the NRF when starting operating in a service provider network and thus allow the NRF to recognize that the corresponding NF is operating within the network. The NEF is an abbreviation of a network exposure function and serves to expose a function and a service inside the mobile communication service provider network to the outside. Accordingly, the NEF is connected to an external application server (AS) and performs a function of transmitting an event or information generated by the NF within the network or transmitting an event or information which the AS makes a request for to the NF. A UDM plays the same role as an HSS of a 4G network and is an abbreviation of unified data management. The UDM stores subscription information of the UE or context used by the UE within the network.

As a technology that is a background of the disclosure, a function for supporting a CIoT service is described below.

Scheduled Downlink Data Communication Service: a 5G mobile communication network may receive schedule information of a scheduled downlink data transmission time for a specific terminal or group from a $3^{rd}$ party AS. The $3^{rd}$ party AS may be an application server existing outside 5G mobile communication network elements. For example, if industrial IoT supports data transmission using a 5G mobile communication system, an application server operating for the an industrial IoT service may be considered as a $3^{rd}$ party AS from a viewpoint of the 5G mobile communication system. In another example, a service provider providing an IoT service may issue a command to IoT UEs at a regular time or designate a scheduled communication time to perform a software update at a specific time. The $3^{rd}$ party AS may provide an available time for which the UE accesses a 3G network to receive data or schedule information (that is, a time for which the UE is reachable the network, can receive paging, or should be in a connected state) through an "Expected UE Behaviour" Provisioning API. The scheduled information may include a plurality of pieces of schedule information. For example, a plurality of schedules such as 9 o'clock every Monday, 0 p.m. every morning, 10 hours from the present time, and 20 minutes from the present time may be provided.

When the UE desires to use a power saving state (a state in which the UE is not reachable the network to reduce power consumption, that is, a state in which the UE does not perform a network connection-related operation, such as not monitoring a paging channel), the network receiving the schedule information may be configured to find the UE (such that the UE is reachable) at the scheduled communication time. For example, the scheduled communication time may be compared to a time at which the UE periodically informs the network of reachability (for example, a periodic registration request timer) and the next periodic registration request time of the UE may be configured to be suitable for the scheduled communication time. In another example, if the scheduled communication time is earlier than the next periodic registration request time of the UE, a power saving function of the UE may not be allowed, and thus the UE may be reachable at the corresponding time.

FIGS. 1A and 1B illustrate a method by which an AMF 120 or an SMF 140 acquires schedule information of scheduled data transmission, triggers a registration procedure of a UE 100, and negotiates a policy for running a periodic registration timer with the UE 100 through the registration procedure according to an embodiment of the disclosure.

The UE 100 may perform an operation (for example, IDLE mode DRX) of stopping monitoring a paging channel (for example, MICO mode, PSM in 4G system) or monitoring a paging channel only in a specific time interval in order to reduce power consumption. To this end, the UE 100 should negotiate with the AMF 120 through a registration procedure. In the disclosure, negotiation of the UE 100 about the use of a MICO mode is described by way of example. However, this may comprehensively include other functions for negotiation of the UE 100 with the AMF 120 to reduce power consumption. For example, other functions may include 5G Power Saving Mode, 5G discontinuous reception (DRX), and 5G Extended DRX. The disclosure describes the MICO mode for convenience. The MICO mode refers to a mode in which, when the UE 100 enters an IDLE mode, the UE 100 cannot be found in the 5G network, that is, a mode in which the UE 100 moves to an unreachable state without monitoring of all paging channels. When the UE 100 should transmit data or should performing signaling, or after a periodic registration request timer configured by the network expires, the UE 100 accesses again the 5G network. Accordingly, the network cannot wake up the UE 100 before a registration request procedure performed at a periodic time configured by the UE 100.

The following information is proposed according to an embodiment of the disclosure. A periodic registration request time indicates a time at which the UE 100 should periodically make a registration request. This is allocated to the UE 100 by the AMF 120. A periodic registration request timer is a timer operating according to the periodic registration request time and operates in each of the UE 100 and the AMF 120. Further, the disclosure proposes a policy for the operation of the periodic registration request timer of the UE 100 (for convenience, referred to as a periodic registration request timer policy). This means an indicator (or indication) indicating that when the UE 100 operates the periodic registration request timer, the UE 100 continuously operates the periodic registration request timer without stopping the same during transition from CM-IDLE to CM-Connected. Alternatively, the periodic registration timer running policy may mean an indicator indicating starting the corresponding timer from the moment the UE 100 receives allocation of the periodic registration request timer and continuously operating the periodic registration request timer without stopping the same during transition from CM-Connected to CM-IDLE or from CM-Connected to CM-IDLE. Further, an indicator indicating whether the periodic registration timer running policy is a one-shot policy (that is, a policy released after one application) or a continuously applied policy (a policy for continuously maintaining the periodic registration request timer policy before the AMF provides a new policy) may be additionally included. If the indicator indicating continuously operating the periodic registration request timer without stopping the same, such as the periodic registration timer running policy, is included, the UE 100 continuously operates the corresponding time during transition from CM-IDLE to CM-Connected, still operates the timer while the connected state is maintained, and continuously operates the timer until the timer expires. Further, the UE starts the corresponding timer from the moment the UE 100 receives allocation of the periodic registration request timer along with the indicator and continuously operates the periodic registration request timer without stopping the same during transition from CM-Connected to CM-IDL or from CM-Connected to CM-IDLE. If the indicator indicating that the periodic registration timer running policy is a one-shot policy is included, the UE 100 may release the application of the corresponding policy after the periodic registration request timer expires. That is, the normal operation (stopping the timer during transition from CM-IDLE to CM-Connected or restarting the timer from a timer initial value during transition from CM-Connected to CM-Idle) may be performed as the operation of the periodic registration timer.

A $3^{rd}$ party application server or an AS may configure a scheduled communication time in the 5G network. The configuration may be performed as the AS directly transmits a message to a UDM or the AMF 120 or as the AS transmits information to the UDM through the NEF and the UDM transmits the corresponding information to the AMF 120 or the SMF 140 through UE context. The AS may configure the scheduled communication time to be a plurality of schedules and transmit the same. For example, the AS may transmit a plurality of pieces of schedule information such as 0 o'clock every day, 12:30 every day, 20 minutes later, or an absolute time value (for example, UTC 20:00, Jul. 10, 2018) indicating a timer later than now through the 5G network.

The disclosure premises that the scheduled communication time is stored in context of the UE 100 in the UDM and the AMF 120 or the SMF 140 acquires the scheduled communication time in steps 101 and 102a. The AF may provide corresponding information through the NEF, the NEF may transmit the same to the UDM, and the UDM may classify and store the corresponding information as session management context of the UE 100. Alternatively, the NEF may directly transmit the scheduled communication time for the specific UE 100 to the AMF 120 or the SMF 140 and the AMF 120 or the SMF 140 may acquire the corresponding value according to steps 101 and 102a. Since the scheduled communication time is provided from a $3^{rd}$ party to the UDM for a specific UE 100 indicated by an external ID or an external group ID, the UDM may store the scheduled communication time value in SM context according to each external ID or external group ID of the UE 100. This is because the UE 100 may have several external IDs or external group IDs. Alternatively, the scheduled communication time may be provided from a $3^{rd}$ party to the UDM as a value for a data network name (DNN) for a specific UE 100 indicated by an external ID or an external group ID. In this case, the UDM may store the scheduled communication time in SM context according to a DNN value for each external ID or external group ID of the UE 100. This is to support the case in which the UE 100 has several external IDs or external group IDs or in which subscriber information is configured such that the UE 100 uses several DNNs for an NIDD service. That is, the scheduled communication time may be configured in subscriber information of the UDM for each UE, and a plurality of scheduled communication time may be configured for each external ID or external group ID or for each of the external ID/external group ID and the DNN.

Step 102b is an operation performed when the SMF 140 acquires the scheduled communication time information from the UDM through SM context for the UE 100 or the SMF 140 acquires the same from the NEF, that is, after step 102a. The SMF 140 may identify when downlink data of the corresponding UE 100 is transmitted on the basis of the scheduled communication time. Since the UE 100 should reach the 5G network at the corresponding time, the SMF 140 may transmit a message indicating reachability of the UE 100 to the AMF 120 performing mobility management of the UE 100. This is one of APIs provided by the AMF 120 and is different from the name of step 102b in the drawing, but may correspond to a message proposed by the disclosure if the message is to provide the scheduled communication time of the specific UE 100 to the AMF 120 by the SMF 140. For example, the message may be transmitted using an API provided by the SMF 140, such as Nsmf_PDU Session Update SM Context. The SMF 140 may include an ID of the UE 100 (an ID by which the AMF identifies the UE, for example, a subscription concealed identifier (SUCI), a subscription permanent identifier (SUPI corresponding to a conventional IMSI), or an external ID), the scheduled communication time acquired in step 102a, and a PDU session ID indicating a corresponding PDU session in step 102b. A reason why the PDU session ID is included is that, if the UE 100 uses data communication with several PDU sessions, the UE 100 may determine which PDU session should be activated when the UE 100 transmits a service request and wakes up at the scheduled communication time. Further, the reason is to identify a PDU session for the scheduled communication time by the AMF 120 if the UE 100 uses data communication with several PDU sessions. If the AMF 120 may receive several scheduled communication time values from a plurality of SMFs or one SMF, the AMF 120 may identify the scheduled communication time values for respective PDU sessions on the basis of the PDU session ID included in message step 102b.

The AMF 120 recognizing the scheduled communication time for the UE 100 through the message of step 102b or step 101 may store the same in context of the UE 100. Further, the AMF 120 may allocate a periodic registration timer value on the basis thereof. The AMF 120 may determine to apply a periodic registration timer running policy to the UE 100 in order to allow the UE 100 to wake up and access the network at the scheduled communication time. That is, the AMF 120 may not stop the periodic registration timer when the UE 100 transitions from CM-IDLE to CM-Connected, continuously operate the periodic registration timer even when the UE 100 is in the connected state, and perform the registration procedure when the periodic registration timer expires in the CM-IDLE state of the UE 100 to allow the UE 100 to access the network and attach to the network at a time point at which scheduled communication is performed.

The AMF 120 may perform step 103 to transmit the periodic registration time value and the periodic registration timer running policy according to the scheduled communication time, or may transmit the same to the UE 100 when the UE 100 makes a request for an operation of escaping the reachable state from the network during a specific time, for example, a request for a MICO mode through the registration procedure in order to reduce power consumption through the registration procedure.

The AMF 120 may recognize that the scheduled communication time is configured in the UE 100 according to step 101 or 102b, and accordingly, determine to control the periodic registration request timer value of the UE 100. Further, the AMF 120 may determine the policy for the operation of the periodic registration request timer of the UE 100. For example if the scheduled communication time for the UE 100 is a one-shot time, that is, if the scheduled communication time indicates a specific time (UTC 12:00, 2019-02-12), the periodic registration request timer policy may be determined as a one-shot policy. In another example, if the scheduled communication time for the UE 100 is a regular time, that is, if the scheduled communication time is, for example, 9 a.m. every Monday or 12 p.m. every day, the periodic registration request timer policy may be determined as a continuously applied policy. The AMF 120 may configure an indicator according thereto, which may be transmitted to the UE 100 during the registration procedure.

In order to make the UE 100 wake up at the scheduled communication time, the AMF 120 may perform a UE configuration update procedure in step 103 to transmit the periodic registration timer to the UE 100 or to perform the registration procedure. This is to transmit the periodic registration timer value according to the scheduled communication time and the periodic registration timer running policy to the UE 100. The AMF 120 may include the periodic registration time value and the periodic registration timer running policy determined through the procedure in a UE configuration update command message in step 103. The periodic registration timer running policy may be an indicator indicating continuous operation of the periodic registration timer regardless of transition between CM-IDLE and CM-Connected. Alternatively, the periodic registration timer running policy may mean an indicator indicating starting the corresponding timer from the moment the UE 100 receives allocation of the periodic registration request timer and continuously operating the periodic registration request timer without stopping the same during transition from CM-Connected to CM-IDLE or from CM-Connected to CM-IDLE. Further, an indicator indicating whether the corresponding periodic registration timer running policy is a one-shot policy or a policy that should be continuously maintained may be included. The UE 100 may transmit a response message of the UE configuration update command transmitted by the AMF 120 and, at this time, may acknowledge the application of the transmitted information.

Alternatively, the AMF 120 may perform only an operation for triggering the UE 100 to transmit a registration request instead of inserting the periodic registration timer and the periodic registration timer running policy information into the UE configuration update command message. Accordingly, the AMF 120 may insert an indicator indicating that the registration procedure is needed into the UE configuration update command message and transmit the message to the UE 100. At this time, the AMF 120 may also transmit an indicator indicating the UE 100 can use the MICO mode. The UE 100 transmits a response message of the UE configuration update command transmitted by the AMF 120.

The UE 100 inserts an indicator indicating the UE will use the MICO mode into a registration request message and transmits the message in step 104. Step 104 may be performed as the operation according to step 103. That is, if the AMF 120 informs the UE 100 that the registration procedure is needed through the UE configuration update command message of step 103, the registration procedure may be performed in step 104. Alternatively, step 104 may be performed because the UE 100 negotiates with the AMF 120 in order to activate the MICO mode so as to reduce power consumption. In addition, step 104 may be a registration procedure according to movement of the UE 100 or a registration procedure performed at a periodic time. Further, step 104 may be registration procedure by the UE 100 to synchronize a time with the network. Under other conditions, the UE 100 may perform all registration procedures with the AMF 120.

The AMF 120 may determine whether to allow the UE 100 to execute the MICO mode in step 105. If the scheduled communication time for the UE 100 arrives soon, the AMF 120 may not allow the UE 100 to execute the MICO mode such that the UE 100 continuously remains in the reachable state without entering the MICO mode. If the scheduled communication time value for the UE 100 arrives sufficiently after the entry into the MICO mode of the UE 100, the AMF 120 may allow the UE 100 to execute the MICO mode such that the UE 100 enters the MICO mode and reduces power consumption.

The AMF 120 may configure, in the UE 100 to execute the MICO mode, a periodic registration timer value which should be operated by the corresponding UE 100 in step 106. This may be configured on the basis of the scheduled communication time value, and the AMF 120 may configure a value indicating a little earlier time than the scheduled communication time. This is to consider a delay that may be generated when the UE 100 accesses the network. Further, the AMF 120 may configure the periodic registration timer running policy in order to allow the UE 100 to wake up at the scheduled communication time and access the network. This refers to an indicator indicating continuously operation of the periodic registration request timer without stop during transition from CM-IDLE to CM-Connected. Further, an indicator indicating whether the periodic registration timer running policy is a one-time policy (that is, a policy released after one application) or a continuously applied policy (a policy for continuously maintaining the periodic registration request timer policy before the AMF provides a new policy) may be additionally included.

The AMF 120 may transmit the periodic registration timer value and the periodic registration timer running policy determined in step 106 along with the indicator indicating allowance of the MICO mode to the UE 100 in step 107. The UE 100 receiving the same may determine continuous operation of the periodic registration request timer without stop on the basis of the periodic registration timer running policy in the received information when the UE transitions from CM-IDLE to CM-Connected. Accordingly, the UE 100 may operate the periodic registration timer according to the periodic registration timer value received after the registration procedure ends (that is, after step 108 in which the registration complete message is transmitted to the AMF 120). Alternatively, the UE 100 may operate the corresponding timer after receiving the registration accept, identifying the periodic registration request timer included in the registration accept, and identifying whether the corresponding timer is applied to the periodic registration timer running policy. The UE 100 may continuously operate the corresponding timer even during the transition from CM-IDLE to CM-Connected, still operate the timer while the UE maintains the connected state, and continuously operate the timer until the timer expires. If the indicator indicating that the periodic registration timer running policy is a one-time policy is included, the UE 100 releases the application of the corresponding policy after the periodic registration request timer expires. That is, the normal operation (stopping the timer during transition from CM-IDLE to CM-Connected or reinitiating the timer from a timer initial value during transition from CM-Connected to CM-Idle) may be performed as the operation of the periodic registration timer.

The UE 100 may inform of the completion of the registration procedure through step 108. According to an embodiment of the disclosure, the UE 100 may transmit acknowledgement indicating that the periodic registration timer running policy received in step 107 will be applied to the AMF 120 through a registration complete message. The AMF 120 receiving the acknowledgment may determine that the UE 100 applies the periodic registration timer running policy and, accordingly, operate the periodic registration timer on the AMF 120 side. Since the UE 100 transmitted the acknowledgement indicating the application of the periodic registration timer running policy, the AMF 220 may continuously operate the corresponding timer even when the connection state of the UE 100 transitions from CM-IDLE to CM-Connected, still operate the timer during the connected state, and continuously operate the timer until the timer expires like the operation of the UE. The AMF 120 may execute the timer right after the registration complete message is received. The periodic registration timer value operated on the AMF 120 side may be a little larger than a value allocated to the UE 100. For example, the periodic registration timer value may be 5-minutes larger. This is because a time delay may be generated due to an error of a radio condition during the periodic registration procedure performed by the UE 100 and is to prevent the AMF 120 from determining that the UE 100 implicitly detaches if the AMF 120 cannot receive the registration request message from the UE 100 after the periodic registration timer expires for a time due to the error. As the AMF 120 operates the timer having a little larger value, the AMF 220 may correctly perform the registration procedure without determining that the UE 100 is implicitly detached even though there is a delay of the registration procedure of the UE 100 due to the error of the radio condition.

According to an embodiment of the disclosure, the UE 100 may not transmit acknowledgement indicating that the periodic registration timer running policy received in step 107 will be applied to the AMF 120 through a registration complete message. That is, if the UE 100 does not support the periodic registration timer running policy or determines not to use the same, the UE 100 may not transmit the registration complete message to the AMF 120, and even though the registration complete message is transmitted, the UE 100 may not insert acknowledgement indicating that the periodic registration timer running policy is applied. The AMF 120 receiving the registration complete message may determine that the UE 100 does not support or use the periodic registration timer running policy. Accordingly, the AMF 120 may operate the periodic registration timer according to the normal operation. Since the UE 100 does not support or apply the periodic registration timer running policy, the UE 100 operates the periodic registration timer according to the normal operation.

After completing the registration procedure, the UE 100 allowed to execute the MICO mode may transition to the IDLE state and then operate in the MICO mode. Further, if it is determined to apply the periodic registration timer running policy, the UE 100 may operate the periodic registration timer according thereto. The network cannot page the UE 100 while the UE 100 is in the MICO mode. If the UE 100 operates a DRX cycle having a long value rather than the MICO mode, the network cannot page the UE 100 while the UE 200 is in a DRX sleep cycle. However, if there is data or signaling to be transmitted to the network, the UE 100 may wake up anytime and communicate with the network in step 109. If there is a newly configured scheduled communication time value, the AMF 120 may perform an operation for updating the periodic registration timer and the periodic registration timer running policy in the UE 100 through a UE configuration update procedure (same as step 103).

According to an embodiment of the disclosure, if the configured periodic registration timer expires in step 110*a*, the UE 100 makes a registration request in order to wake up and access the network and transition to the connected state. The AMF 120 receiving the registration request switches the state of the UE 100 to the connected state. According to an embodiment of the disclosure, the AMF 120 may inform the SMF 140 for a PDU session or a DNN configuring the scheduled communication time of reachability of the UE 100 and activate a user plane of the UE 100 or a data path of the UE 100 so as to transmit scheduled downlink data.

In step 110*a*, the UE 100 may be in the CM-Connected state. That is, the periodic registration timer may have expired while the UE 100 accesses the network and transmit/receive data for the data transmission operation. In this case, the UE 100 has already accessed the network, and thus does not need to perform the registration procedure for network access at a time point at which the timer has expired. According to an embodiment of the disclosure, the UE 100 performs the following operation. First, if the periodic registration timer running policy is configured and accordingly the periodic registration timer is operated, the UE 100 may determine not to perform the periodic registration procedure in the connected state when the timer expires on the basis of the determination. Since the timer has expired, the UE 100 does not restart the periodic registration timer until the UE 200 transitions to the CM-IDLE state. After transmitting and receiving data, the UE 100 transitions to the CM-IDLE state and then operates the periodic registration timer again. Alternatively, if the UE 100 is in the CM-connected state at a time at which the timer expires, the UE 100 may immediately restart the timer by applying the preset periodic registration timer and the periodic registration timer running policy therefor without performing the periodic registration procedure. In other words, if the timer expires in the connected state, the UE may continuously apply the periodic registration timer running policy until next timer expiration without waiting for transition to CM-IDLE. At this time, if the UE 100 receives an indicator indicating whether the periodic registration timer running policy is a one-shot policy or a continuously used policy from the AMF 120, the UE 200 may perform the following operation according to the indicator. If the periodic registration timer running policy is a one-shot policy, the UE 100 releases the periodic registration timer running policy after the periodic registration timer expires in the connected state. That is, the UE 200 does not apply the periodic registration timer running policy any more. If the periodic registration timer running policy is a continuously applied policy, the UE 100 continuously maintains the periodic registration timer running policy after the periodic registration timer expires in the connected state. Accordingly, after the timer expires in the CM-connected state, the timer may be restarted and operated according to the periodic registration timer running policy. Second, the UE 100 may perform the periodic registration procedure in the connected state. If the periodic registration timer running policy is configured and accordingly the periodic registration timer is operated even though the timer has expired and the UE 100 is in the connected state, the UE 100 may determine not to perform the periodic registration procedure when the timer expires in the connected state on the basis of the determination. Through the procedure, the UE 100 may receive reallocation of the periodic registration timer, receive a new periodic registration timer running policy, or identify no more application of the periodic registration timer running policy. If the AMF 120 does not insert the periodic registration timer running policy into a registration accept message, the UE 100 may determine that the periodic registration timer running policy is not applied any more.

If the periodic registration timer operated on the AMF side for the UE 100 expires, the AMF 120 may perform a UE configuration update procedure in step 103 according to an embodiment of the disclosure when the corresponding UE 100 is in the connected state and when the periodic registration timer running policy is being applied. This is to update the periodic registration timer value according to the scheduled communication time and the periodic registration timer running policy information in the UE 100. If the scheduled communication time is not valid any more, that is, if the AMF 120 determines that there is no configured scheduled communication time or there is no need to apply the scheduled communication time any more, the AMF 220 may inform the UE 100 of release of the periodic registration timer running policy through the UE configuration update procedure. In another example, if there is a valid scheduled communication timer configured after the present time, the AMF 120 may configure a periodic registration timer according to the corresponding scheduled communication time and determine to apply the periodic registration timer running policy. The AMF 120 may insert the periodic registration timer value determined through the procedure and the periodic registration timer running policy into a UE configuration update command message. The periodic registration timer running policy may be an indicator indicating continuous operation of the periodic registration timer regardless of transition between CM-IDLE and CM-Connected. Further, an indicator indicating whether the corresponding periodic registration timer running policy is a one-shot policy or a policy that should be continuously maintained may be included. The UE 100 may transmit a response message of the UE configuration update command transmitted by the AMF 120 and, at this time, may acknowledge the application of the transmitted information. If the AMF 120 determines not to apply the periodic registration timer running policy any more, the AMF 220 may insert an indicator indicating release of the periodic registration timer running policy into the UE configuration update command message. After determining that the UE is a UE to which the periodic registration timer running policy is applied, the AMF 120 may insert the indicator indicating release of the periodic registration timer running policy into the UE configuration update command message transmitted to the corresponding UE 100. The UE 100 may transmit a response message of the UE configuration update command transmitted by the AMF 120 and, at this time, may acknowledge the application of the transmitted information.

Alternatively, the AMF 120 may perform only an operation for triggering the UE 100 to transmit a registration request instead of inserting the periodic registration timer and the periodic registration timer running policy information into the UE configuration update command message. Accordingly, the AMF 120 may insert an indicator indicating that the registration procedure is needed into the UE configuration update command message and transmit the message to the UE 100. At this time, the AMF 120 may also transmit an indicator indicating the UE 100 can use the MICO mode. The UE 100 may transmit a response message of the UE configuration update command transmitted by the AMF 120. Thereafter, the UE 100 performs the registration procedure in step 104.

Step 110*b* indicates generation of downlink data at the scheduled communication time as arranged. After receiving downlink data from the data network, a UPF 160 may inform the SMF 140 of the reception of the downlink data and activate a data path through which the data can be transmitted to the UE 100. Such a process may follow a NW-initiated service request. According to the NW-initiated service request, the network pages the UE 100, and the UE 100 having woken up transmits a service request and transitions to the connected state.

The UE 100 may transmit a registration request message to the AMF 220 in step 111 according to the determination operation of step 110*a*. The AMF 120 receiving the registration request message may maintain the connection of the UE 100 for a predetermined time until a downlink data notification for the UE 100 is received. If the UE 100 returns to the IDLE state, the UE 200 may become unreachable again. If the downlink data for the UE 100 arrives while the connection of the UE 100 is maintained and the SMF 140 informs the AMF 120 of activation of the data path for the corresponding UE 100, the AMF 120 may perform a procedure for activating the corresponding data path. In another example, the UE 100 may also insert information on a PDU session for activating the data path into "PDU Session to be Activated" along with the registration request in step 111. The insertion is performed because the UE 100 applied the periodic registration timer running policy and it is determined that there is scheduled communication. Accordingly, it is to activate the data path by making a request for activating the corresponding PDU session. This has an effect of omitting a procedure in which the SMF 140 informs the AMF 120 of arrival of the downlink data. The AMF 120 receiving the arrival of the downlink data may trigger the SMF 140 for the corresponding PDU session to activate the data path. After the data path for transmitting data to the UE 100 is activated by the three operations, the data may be transmitted to the UE 100 in step 112.

Figure 2B:
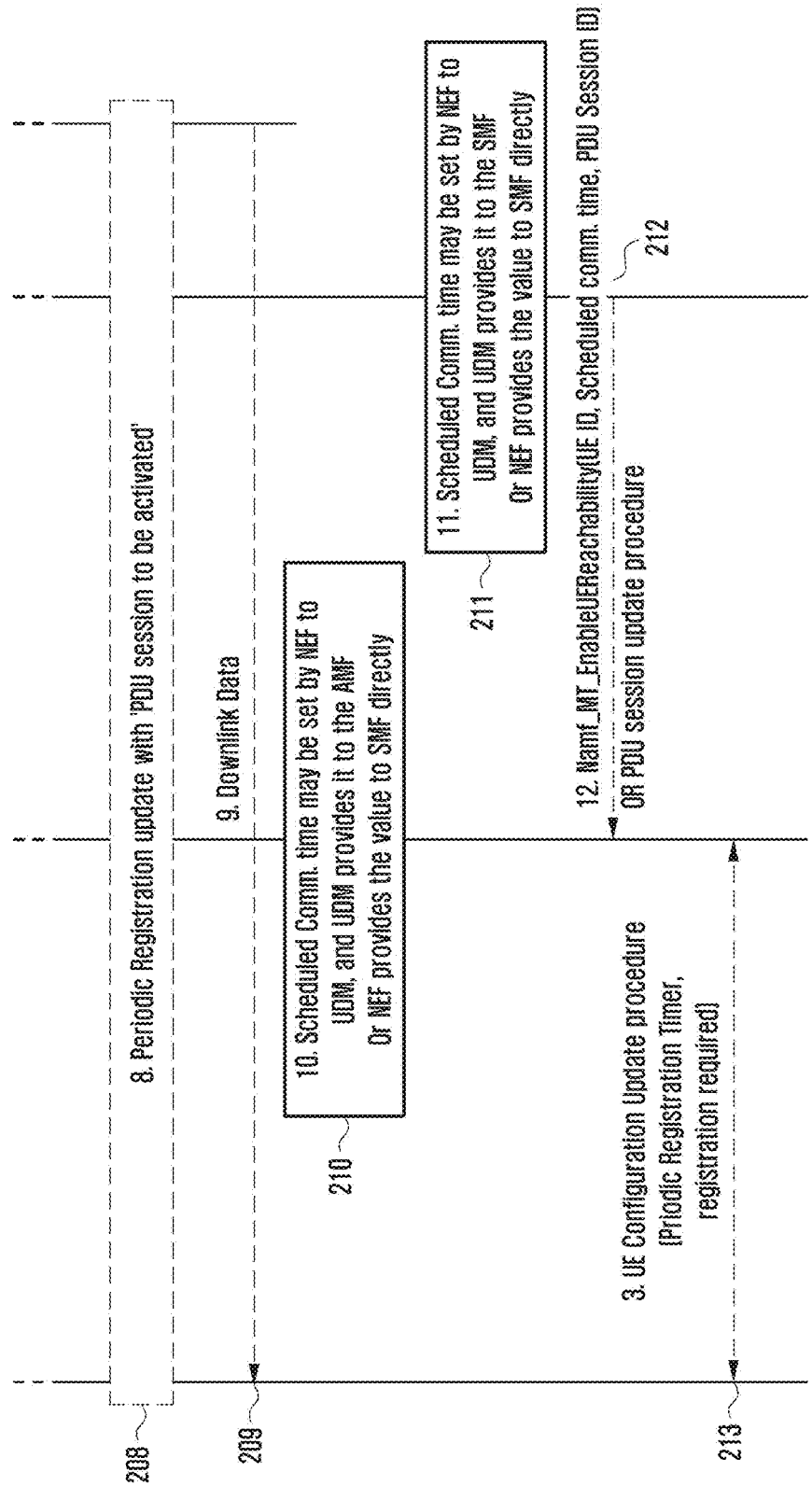

FIGS. 2A and 2B an operation in which an AMF 220 negotiates capability for a policy of operating a periodic registration timer with a UE 200 through a registration procedure and a method by which the AMF 220 or an SMF 240 acquires schedule information for scheduled data transmission and then triggers a registration procedure of the UE according to an embodiment of the disclosure.

The UE 200 may perform an operation (for example, IDLE mode DRX) of stopping monitoring a paging channel (for example, MICO mode, PSM in 4G system) or monitoring a paging channel only in a specific time interval in order to reduce power consumption. To this end, the UE 200 should negotiate with the AMF 220 through a registration procedure. In the disclosure, negotiation of the UE 200 about the use of a MICO mode is described by way of example. However, this may comprehensively include other functions for negotiation of the UE 200 with the AMF 220 to reduce power consumption. For example, other functions may include 5G Power Saving Mode, 5G DRX, and 5G Extended DRX. The disclosure describes the MICO mode for convenience. The MICO mode refers to a mode in which, when the UE 200 enters an IDLE mode, the UE 200 cannot be found in the 5G network, that is, a mode in which the UE 100 moves to an unreachable state without monitoring of all paging channels. If the UE 200 should transmit data or should performing signaling, or after a periodic registration request timer configured by the network expires, the UE 100 accesses again the 5G network. Accordingly, the network cannot wake up the UE 100 before a registration request procedure performed at a periodic time configured by the UE 200.

The following information is proposed according to an embodiment of the disclosure. A periodic registration request time indicates a time at which the UE 200 should periodically make a registration request. This is allocated to the UE 200 by the AMF 220. A periodic registration request timer is a timer operating according to the periodic registration request time value and operates in each of the UE 200 and the AMF 220. Further, the disclosure proposes a policy for the operation of the periodic registration request timer of the UE 200 (for convenience, referred to as a periodic registration request timer policy). This means an indicator indicating that when the UE 200 operates the periodic registration request timer, the UE 200 continuously operates the periodic registration request timer without stopping the same during transition from CM-IDLE to CM-Connected. Further, an indicator indicating whether the periodic registration timer running policy is a one-time policy (that is, a policy released after one application) or a continuously applied policy (a policy for continuously maintaining the periodic registration request timer policy before the AMF provides a new policy) may be additionally included. If the indicator indicating continuously operating the periodic registration request timer without stopping the same when the UE transitions from the CM-IDLE state to the CM-Connected state through the periodic registration timer running policy is included, the UE 200 continuously operates the corresponding time during transition from CM-IDLE to CM-Connected, still operates the timer while the connected state is maintained, and continuously operates the timer until the timer expires. Alternatively, the UE 200 may start the corresponding timer from the moment the UE 200 receives allocation of the periodic registration request timer and continuously operate the periodic registration request timer without stopping the same during transition from CM-Connected to CM-IDL or from CM-Connected to CM-IDLE. If the indicator indicating that the periodic registration timer running policy is a one-time policy is included, the UE 200 releases the application of the corresponding policy after the periodic registration request timer expires. That is, the normal operation (stopping the timer during transition from CM-IDLE to CM-Connected or restarting the timer from a timer initial value during transition from CM-Connected to CM-Idle) may be performed as the operation of the periodic registration timer.

A 3rd party application server or an AS may configure a scheduled communication time in the 5G network. The configuration may be performed as the AS directly transmits a message to a UDM or the AMF 220 or as the AS transmits information to the UDM through the NEF and the UDM transmits the corresponding information to the AMF 220 or the SMF 240 through UE context. The AS may configure the scheduled communication time to be a plurality of schedules and transmit the same. For example, the AS may transmit a plurality of pieces of schedule information such as 0 o'clock every day, 12:30 every day, 20 minutes later, or an absolute time value (for example, UTC 20:00, Jul. 10, 2018) indicating a timer later than now through the 5G network.

The UE 200 may insert an indicator indicating the UE will use the MICO mode into a registration request message and transmit the message in step 201. Further, according to an embodiment of the disclosure, the UE 200 may also insert and transmit an indicator indicating whether the UE 200 is able to support the periodic registration timer running policy. The UE 200 may indicate whether the UE can support a function of continuously operating the periodic registration timer while the UE transitions from CM-IDLE state to the CM-Connected state and while the CM-Connected state is maintained through the periodic registration timer running policy, that is, the indicator. If the UE 200 inserts the indicator into the message, the AMF 220 receiving the indicator may determine that the UE 200 supports the corresponding function. Similarly, if the UE 200 does not insert the indicator into the message, the AMF 220 receiving the registration request message may determine that the UE 200 does not support the corresponding function. Step 201 may be performed as the operation according to step 213. That is, if the AMF 220 informs the UE 200 that the registration procedure is needed through the UE configuration update command message of step 213, the registration procedure may be performed in step 201. Alternatively, step 201 may be performed because the UE 200 negotiates with the AMF 120 in order to activate the MICO mode so as to reduce power consumption. In addition, step 201 may be a registration procedure according to movement of the UE 200 or a registration procedure performed at a periodic time. Further, step 201 may be registration procedure by the UE 200 to synchronize a time with the network. Under other conditions, the UE 200 may perform all registration procedures with the AMF 220.

The AMF 220 may determine whether to allow the UE 200 to execute the MICO mode in step 202. If the scheduled communication time for the UE 200 arrives soon, the AMF 220 may not allow the UE 200 to execute the MICO mode such that the UE 200 continuously remains in the reachable state without entering the MICO mode. If the scheduled communication time for the UE 200 arrives sufficiently after the entry into the MICO mode of the UE 200, the AMF 220 may allow the UE 200 to execute the MICO mode such that the UE 100 enters the MICO mode and reduces power consumption.

The AMF 220 determining to allow the UE 200 to execute the MICO mode in step 202 may configure a periodic registration timer value that should be operated by the corresponding UE 200 according to the scheduled communication time configured in the UE 200. Further, the periodic registration timer running policy may be determined. At this time, according to an embodiment of the disclosure, the AMF 220 may determine whether to apply the periodic registration timer running policy to the UE 200 on the basis of an indicator indicating capability for the periodic registration timer running policy in the message of step 201 received from the UE 200. That is, if the UE 200 inserts the indicator into the message, the AMF 220 receiving the indicator may determine that the UE 200 supports the corresponding function. Similarly, if the UE 200 does not insert the indicator into the message, the AMF 220 receiving the registration request message may determine that the UE 200 does not support the corresponding function. Alternatively, if the indicator itself indicates the presence of capability for the periodic registration timer running policy, it may be determined that the UE 200 supports the corresponding function. Alternatively, if the indicator itself indicates the absence of capability for the periodic registration timer running policy, it may be determined that the UE 200 does not use the corresponding function. The AMF 220 may determine the periodic registration time on the basis of the scheduled communication timer values, and configure a value indicating a time little earlier than the scheduled communication time. This is to consider a delay that may be generated when the UE 200 accesses the network. Further, the AMF 220 may configure the periodic registration timer running policy in order to allow the UE 200 to wake up at the scheduled communication time and access the network. This refers to an indicator indicating continuously operation of the periodic registration request timer without stop during transition from CM-IDLE to CM-Connected. Alternatively, the indicator may be an indicator indicating operation of the periodic registration timer immediately upon receipt (that is, after receiving a registration accept message and identifying periodic registration timer and periodic registration timer running policy information included the registration accept message) and continuous operation of the periodic registration request timer without stopping when the UE transitions from CM-Connected to CM-IDLE or from CM-Connected to CM-IDLE. Further, an indicator indicating whether the periodic registration timer running policy is a one-time policy (that is, a policy released after one application) or a continuously applied policy (a policy for continuously maintaining the periodic registration request timer policy before the AMF provides a new policy) may be additionally included.

The AMF 220 may transmit the periodic registration timer value and the periodic registration timer running policy determined in step 203 along with the indicator indicating allowance of the MICO mode to the UE 200 in step 204. The UE 200 receiving the same may determine continuous operation of the periodic registration request timer without stop on the basis of the periodic registration timer running policy in the received information when the UE transitions from CM-IDLE to CM-Connected. Accordingly, the UE 200 may operate the periodic registration timer according to the periodic registration timer value received after the registration procedure ends. That is, the UE 200 may operate the corresponding timer after receiving the registration accept, identifying the periodic registration request timer included in the registration accept, and identifying whether the corresponding timer is applied to the periodic registration timer running policy. The UE 200 may continuously operate the corresponding timer even during the transition from CM-IDLE to CM-Connected, still operate the timer while the UE maintains the connected state, and continuously operates the timer until the timer expires. If the indicator indicating that the periodic registration timer running policy is a one-time policy is included, the UE 200 may release the application of the corresponding policy after the periodic registration request timer expires. That is, the normal operation (stopping the timer during transition from CM-IDLE to CM-Connected or reinitiating the timer from a timer initial value during transition from CM-Connected to CM-Idle) may be performed as the operation of the periodic registration timer. The AMF 220 may execute the timer after transmitting the registration accept message to the UE 200. The periodic registration timer value operated on the AMF side may be a little larger than a value allocated to the UE 200. For example, the periodic registration timer value may be 5-minutes larger. This is because a time delay may be generated due to an error of a radio condition during the periodic registration procedure performed by the UE 200 and is to prevent the AMF 220 from determining that the UE 200 is implicitly detached if the AMF 220 cannot receive the registration request message from the UE 200 after the periodic registration timer expires for a time due to the error. As the AMF 220 operates the timer having a little larger value, the AMF 220 may correctly perform the registration procedure without determining that the UE 200 is implicitly detached even though there is a delay of the registration procedure of the UE 200 due to the error of the radio condition.

The UE 200 may inform of the completion of the registration procedure through step 205. This step may be omitted. According to an embodiment of the disclosure, the UE 200 may transmit acknowledgement indicating that the periodic registration timer running policy received in step 204 will be applied to the AMF 220 through a registration complete message. The AMF 220 receiving the acknowledgment may determine that the UE 200 applies the periodic registration timer running policy and, accordingly, operate the periodic registration timer on the AMF side. Since the UE 200 transmitted the acknowledgement indicating the application of the periodic registration timer running policy, the AMF 220 may continuously operate the corresponding timer even when the connection state of the UE 200 transitions from CM-IDLE to CM-Connected, still operate the timer during the connected state, and continuously operate the timer until the timer expires like the operation of the UE.

After completing the registration procedure, the UE 200 allowed to execute the MICO mode may transition to the IDLE state and then operate in the MICO mode. Accordingly, the periodic registration timer is operated. If the UE 200 determines to apply the periodic registration timer running policy may operate the periodic registration timer before transitioning to the IDLE state, that is, after receiving the periodic registration timer running policy and receiving the periodic registration timer value therefor. The network cannot page the UE 200 while the UE 200 is in the MICO mode. If the UE 200 operates a DRX cycle having a long value rather than the MICO mode, the network cannot page the UE 200 while the UE 200 is in a DRX sleep cycle. However, if there is data or signaling to be transmitted to the network, the UE 200 may wake up anytime and communicate with the network in step 206. If there is a newly configured scheduled communication time value, the AMF 220 may perform an operation for updating the periodic registration timer and the periodic registration timer running policy in the UE 200 through a UE configuration update procedure.

According to an embodiment of the disclosure, if the configured periodic registration timer expires in step 207a, the UE 200 makes a registration request in order to wake up and access the network and transition to the connected state. The AMF 220 receiving the registration request switches the state of the UE 200 to the connected state. According to an embodiment of the disclosure, the AMF 220 may inform the SMF 240 for a PDU session or a DNN configuring the scheduled communication time of reachability of the UE 200 and activate a user plane of the UE 200 or a data path of the UE 200 so as to transmit scheduled downlink data.

In step 207a, the UE 200 may be in the CM-Connected state. That is, the periodic registration timer may have expired while the UE 200 accesses the network and transmit/receive data for the data transmission operation. In this case, the UE 200 has already accessed the network, and thus does not need to perform the registration procedure for network access at a time point at which the timer has expired. According to an embodiment of the disclosure, the UE 200 perform the following operation. First, if the periodic registration timer running policy is configured and accordingly the periodic registration timer is operated, the UE 200 may determine not to perform the periodic registration procedure when the timer expires in the connected state on the basis of the determination. Since the timer has expired, the UE 200 does not restart the periodic registration timer until the UE 200 transitions to the CM-IDLE state. After transmitting and receiving data, the UE 200 transitions to the CM-IDLE state and then operates the periodic registration timer again. Alternatively, if the periodic registration timer running policy is configured and accordingly the periodic registration timer is operated, the UE 200 may restart the corresponding timer immediately from a time at which the periodic registration timer expires when the timer expires in the CM-connected state. That is, the UE 200 may immediately start the timer without waiting for transition to the CM-IDLE state. If the periodic registration timer expires when the UE 200 to which the periodic registration timer running policy is applied is in the CM-connected state, the AMF 220 may also restart the periodic registration timer immediately from the expiration time. At this time, if the UE 200 receives an indicator indicating whether the periodic registration timer running policy is a one-shot policy or a continuously used policy from the AMF 220, the UE 200 may perform the following operation according to the indicator. If the periodic registration timer running policy is a one-shot policy, the UE 200 releases the periodic registration timer running policy after the periodic registration timer expires in the connected state. That is, the UE 200 does not apply the periodic registration timer running policy any more. If the periodic registration timer running policy is a continuously applied policy, the UE 200 continuously maintains the periodic registration timer running policy after the periodic registration timer expires in the connected state. Accordingly, after the timer expires in the CM-connected state, the timer may be restarted and operated according to the periodic registration timer running policy. Second, the UE 200 may perform the periodic registration procedure in the connected state. If the periodic registration timer running policy is configured and accordingly the periodic registration timer is operated even though the timer has expired and the UE 200 is in the connected state, the UE 200 may determine not to perform the periodic registration procedure when the timer expires in the connected state on the basis of the determination. Through the procedure, the UE 200 may receive reallocation of the periodic registration timer, receive a new periodic registration timer running policy, or identify no more application of the periodic registration timer running policy. If the AMF 220 does not insert the periodic registration timer running policy into a registration accept message, the UE 200 may determine that the periodic registration timer running policy is not applied any more.

If the periodic registration timer operated on the AMF side for the UE 200 expires, the AMF 220 may perform a UE configuration update procedure in step 213 according to an embodiment of the disclosure when the corresponding UE 200 is in the connected state and when the periodic registration timer running policy is being applied. This is to update the periodic registration timer value according to the scheduled communication time and the periodic registration timer running policy information in the UE 200. If the scheduled communication time is not valid any more, that is, if the AMF 220 determines that there is no configured scheduled communication time or there is no need to apply the scheduled communication time any more, the AMF 220 may inform the UE 200 of release of the periodic registration timer running policy through the UE configuration update procedure. In another example, if there is a valid scheduled communication timer configured after the present time, the AMF 220 may configure a periodic registration timer according to the corresponding scheduled communication time and determine to apply the periodic registration timer running policy. The AMF 220 may insert the periodic registration timer value determined through the procedure and the periodic registration timer running policy into a UE configuration update command message. The periodic registration timer running policy may be an indicator indicating continuous operation of the periodic registration timer regardless of transition between CM-IDLE and CM-Connected. Further, an indicator indicating whether the corresponding periodic registration timer running policy is a one-shot policy or a policy that should be continuously maintained may be included. The UE 200 may transmit a response message of the UE configuration update command transmitted by the AMF 220 and, at this time, may acknowledge the application of the transmitted information. If the AMF 220 determines not to apply the periodic registration timer running policy any more, the AMF 220 may insert an indicator indicating release of the periodic registration timer running policy into the UE configuration update command message. After determining that the UE is a UE to which the periodic registration timer running policy is applied, the AMF 220 may insert the indicator indicating release of the periodic registration timer running policy into the UE configuration update command message transmitted to the corresponding UE 200. The UE 200 may transmit a response message of the UE configuration update command transmitted by the AMF 220 and, at this time, may acknowledge the application of the transmitted information.

Alternatively, the AMF 220 may perform only an operation for triggering the UE 200 to transmit a registration request instead of inserting the periodic registration timer and the periodic registration timer running policy information into the UE configuration update command message. Accordingly, the AMF 220 may insert an indicator indicating that the registration procedure is needed into the UE configuration update command message and transmit the message to the UE 200. At this time, the AMF 220 may also transmit an indicator indicating that the UE 200 can use the MICO mode. The UE 200 transmits a response message of the UE configuration update command transmitted by the AMF 220. Thereafter, the UE 200 may perform the registration procedure in step 204.

Step 207b indicates generation of downlink data at the scheduled communication time as arranged. After receiving downlink data from the data network, a UPF 260 may inform the SMF 240 of the reception of the downlink data and activate a data path through which the data can be transmitted to the UE 200. Such a process may follow a NW-initiated service request. According to the NW-initiated service request, the network pages the UE 200, and the UE 200 having woken up transmits a service request and transitions to the connected state.

The UE 200 may transmit a registration request message to the AMF 220 in step 208 according to the determination operation of step 207a. The AMF 220 receiving the registration request message may maintain the connection of the UE 200 for a predetermined time until a downlink data notification for the UE 200 is received. If the UE 200 returns to the IDLE state, the UE 200 may become unreachable again. If the downlink data for the UE 200 arrives while the connection of the UE 200 is maintained and the SMF 240 informs the AMF 220 of activation of the data path for the corresponding UE 200, the AMF 220 may perform a procedure for activating the corresponding data path. In another example, the UE 200 may also insert information on a PDU session for activating the data path into "PDU Session to be Activated" along with the registration request in step 208. The insertion is performed because the UE 200 applied the periodic registration timer running policy and thus it is determined that there is scheduled communication, and accordingly is to activate the data path by making a request for activating the corresponding PDU session. This has an effect of omitting a procedure in which the SMF 240 informs the AMF 220 of arrival of the downlink data. The AMF 220 receiving the arrival of the downlink data may trigger the SMF 240 for the corresponding PDU session to activate the data path. After the data path for transmitting data to the UE 200 is activated by the three operations, the data may be transmitted to the UE 200 in step 209.

The scheduled communication time is stored in context of the UE 200 in the UDM, and thus the AMF 220 or the SMF 240 acquires the scheduled communication time in steps 210 and 211. The AF may provide corresponding information through the NEF, the NEF may transmit the same to the UDM, and the UDM may classify and store the corresponding information as session management context of the UE 200. Alternatively, the NEF may directly transmit the scheduled communication time for the specific UE 200 to the AMF 220 or the SMF 240 and the AMF 220 or the SMF 240 may acquire the corresponding value according to steps 210 and 211. Since the scheduled communication time is provided from a $3^{rd}$ party to the UDM for a specific UE 200 indicated by an external ID or an external group ID, the UDM may store the scheduled communication time in SM context according to each external ID or external group ID of the UE 200. This is because the UE 200 may have several external IDs or external group IDs. Alternatively, the scheduled communication time may be provided from a $3^{rd}$ party to the UDM as a value for a data network name (DNN) for a specific UE 200 indicated by an external ID or an external group ID. In this case, the UDM may store the scheduled communication time in SM context according to a DNN value for each external ID or external group ID of the UE 200. This is to support the case in which the UE 200 has several external IDs or external group IDs or in which subscriber information is configured such that the UE 200 uses several DNNs for an NIDD service. That is, the scheduled communication time may be configured in subscriber information of the UDM for each UE, and a plurality of scheduled communication time may be configured for each external ID or external group ID or for each of the external ID/external group ID and the DNN.

Step 212 is an operation performed when SMF 240 acquires the scheduled communication time information from the UDM through SM context for the UE 200 or the SMF 240 acquires the same from the NEF, that is, after step 211. The SMF 240 may identify when downlink data of the corresponding UE 200 is transmitted on the basis of the scheduled communication time. Since the UE 200 should reach the 5G network at the corresponding time, the SMF 240 may transmit a message indicating reachability of the UE 200 to the AMF 220 performing mobility management of the UE 200. This is one of APIs provided by the AMF 220 and is different from the name of step 212 in the drawing, but may correspond to a message proposed by the disclosure if the message is to provide the scheduled communication time of the specific UE 200 to the AMF 220 by the SMF 240. For example, the message may be transmitted using an API provided by the SMF 240, such as Nsmf_PDU Session Update SM Context. The SMF 240 may include an ID of the UE 200 (an ID by which the AMF identifies the UE, for example, a subscription concealed identifier (SUCI), a subscription permanent identifier (SUPI) corresponding to a conventional IMSI), or an external ID), the scheduled communication time acquired in step 212 and a PDU session ID indicating a corresponding PDU session in step 212. A reason why the PDU session ID is included is that, when the UE 200 uses data communication with several PDU sessions, the UE 200 may determine which PDU session should be activated when the UE 100 transmits a service request and wakes up at the scheduled communication time. Further, the reason is to identify a PDU session for the scheduled communication by the AMF 220 if the UE 200 uses data communication with several PDU sessions. If the AMF 220 may receive several scheduled communication time values from a plurality of SMFs or one SMF, the AMF 220 may identify the scheduled communication time values for respective PDU sessions on the basis of the PDU session ID included in the message.

The AMF 220 recognizing the scheduled communication time for the UE 200 through the message of step 212 or step 210 stores the same in context of the UE 200. Further, the AMF 220 may allocate a periodic registration timer value on the basis thereof. The AMF 220 may determine to apply a periodic registration timer running policy to the UE 200 in order to allow the UE 200 to wake up and access the network at the scheduled communication time. That is, the AMF 120 may not stop the periodic registration timer when the UE 200 transitions from CM-IDLE to CM-Connected, continuously operate the periodic registration timer even when the UE 200 is in the connected state, and perform the registration procedure when the periodic registration timer expires in the CM-IDLE state of the UE 200 to allow the UE 200 to access the network and attach to the network at a time point at which scheduled communication is performed. The AMF 220 may perform step 213 to transmit the periodic registration time value and the periodic registration timer running policy according to the scheduled communication time, or may transmit the same to the UE 200 when the UE 200 makes a request for an operation of escaping the reachable state during a specific time, for example, a request for a MICO mode through the registration procedure in order to reduce power consumption through the registration procedure of the UE 200.

In step 213, the AMF 220 may determine to control the periodic registration request timer value of the UE 200 according to the scheduled communication time configured in the UE 200. Further, the AMF 120 may determine the policy for the operation of the periodic registration request timer of the UE 200. That is, the AMF 120 may determine to apply a policy for continuously operating the periodic registration request timer without stopping the same even though the UE 200 transitions from CM-IDLE to CM-Connected. In another example, if the scheduled communication time for the UE 200 is a one-shot time, that is, if the scheduled communication time indicates a specific time (UTC 12:00, 2019-02-12), the periodic registration request timer policy may be determined as a one-shot policy. In another example, if the scheduled communication time for the UE 200 is a regular time, that is, if the scheduled communication time is, for example, 9 a.m. every Monday or 12 p.m. every day, the periodic registration request timer policy may be determined as a continuously applied policy. The AMF 220 may configure an indicator according thereto, which may be transmitted to the UE 200 during the registration procedure or the UE configuration update procedure.

In order to make the UE 200 wake up at the scheduled communication time, the AMF 220 may perform a UE configuration update procedure in step 213 to transmit the periodic registration timer to the UE 200 or to perform the registration procedure. This is to transmit the periodic registration timer value according to the scheduled communication time and the periodic registration timer running policy to the UE 200. The AMF 220 may insert the periodic registration timer value determined through the step and the periodic registration timer running policy into the UE configuration update command message in step 213. The periodic registration timer running policy may be an indicator indicating continuous operation of the periodic registration timer regardless of transition between CM-IDLE and CM-Connected. Further, an indicator indicating whether the corresponding periodic registration timer running policy is a one-shot policy or a policy that should be continuously maintained may be included. The UE 200 may transmit a response message of the UE configuration update command transmitted by the AMF 220 and, at this time, may acknowledge the application of the transmitted information.

Alternatively, the AMF 220 may perform only an operation for triggering the UE 200 to transmit a registration request instead of inserting the periodic registration timer and the periodic registration timer running policy information into the UE configuration update command message. Accordingly, the AMF 220 may insert an indicator indicating that the registration procedure is needed into the UE configuration update command message and transmit the message to the UE 200. At this time, the AMF 220 may also transmit an indicator indicating the UE 200 can use the MICO mode. The UE 200 transmits a response message of the UE configuration update command transmitted by the AMF 220. The UE 200 receiving a trigger for making the registration request performs the operation according to step 201 of FIG. 2A.

Figure 3:
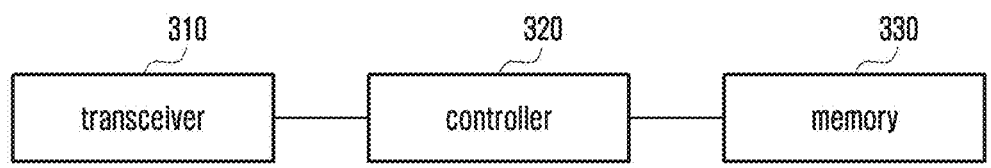
FIG. 3 illustrates a structure of a UE according to an embodiment of the disclosure.

FIG. 3 illustrates a structure of a UE according to an embodiment of the disclosure.

Referring to FIG. 3, the UE may include a transceiver 310, a controller 320, and a memory 330. In the disclosure, the controller may be defined as a circuit, an application-specific integrated circuit, or at least one processor.

The transceiver 310 may transmit/receive a signal to/from another network entity. The transceiver 310 may receive, for example, system information from the BS and receive a synchronization signal or a reference signal.

The controller 320 may control the overall operation of the UE according to an embodiment proposed by the disclosure.

The memory 330 may store at least one piece of information transmitted/received through the transceiver 310 and information generated through the controller 320.

Figure 4:
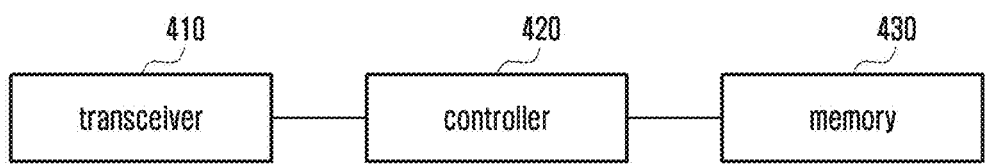
FIG. 4 illustrates a structure of a network entity according to an embodiment of the disclosure.

FIG. 4 illustrates a structure of a network entity according to an embodiment of the disclosure.

Referring to FIG. 4, the BS may include a transceiver 410, a controller 420, and a memory 430. In the disclosure, the controller may be defined as a circuit, an application-specific integrated circuit, or at least one processor.

The transceiver 410 may transmit and receive a signal to and from another network entity and the UE. The transceiver 410 may transmit, for example, system information to the UE and transmit a synchronization signal or a reference signal.

The controller 420 may control the overall operation of the BS according to an embodiment proposed by the disclosure.

The memory 430 may store at least one piece of information transmitted/received through the transceiver 410 and information generated through the controller 420.

The embodiments of the disclosure described and shown in the specification and the drawings have been presented to easily explain the technical contents of the disclosure and help understanding of the disclosure, and are not intended to limit the scope of the disclosure. That is, it will be apparent to those skilled in the art that other modifications and changes may be made thereto on the basis of the technical spirit of the disclosure. Further, the above respective embodiments may be employed in combination, as necessary. For example, the embodiments of the disclosure may be partially combined to operate a base station and a terminal.

Further, although various embodiments of the disclosure have been described and shown in the specification and the drawings by using particular terms, the terms have been used in a general sense merely to easily explain the technical contents of the disclosure and help understanding of the disclosure, and are not intended to limit the scope of the disclosure. It will be apparent to those skilled in the art that, in addition to the embodiments disclosed herein, other variants may be achieved on the basis of the technical spirit of the disclosure.

Although the present disclosure has been described with various embodiments, various changes and modifications may be suggested to one skilled in the art. It is intended that the present disclosure encompass such changes and modifications as fall within the scope of the appended claims.

What is claimed is:

1. A method by an Access and Mobility management Function (AMF) in a wireless communication system, the method comprising:
   receiving, from a User Equipment (UE), a first message including information indicating a capability for a periodic registration timer indication;
   identifying whether the UE supports the periodic registration timer indication based on the information in the first message;
   transmitting, to the UE, a second message including the periodic registration timer indication and a periodic registration timer value based on the identification;
   starting a periodic registration timer after completion of Registration procedure based on the periodic registration timer indication and the periodic registration timer value; and
   restarting the periodic registration timer with applying the periodic registration timer indication in case that the periodic registration timer expires and the UE is in CONNECTED mode.

2. The method of claim 1,
   wherein the starting of the periodic registration timer comprises:
   starting the periodic registration timer after transmitting the second message to the UE.

3. The method of claim 1, further comprising:
   transmitting, to the UE, a third message including information for updating the periodic registration timer value and the periodic registration timer indication.

4. The method of claim 3, wherein the third message is a UE Configuration Update Command message.

5. The method of claim 1, wherein the second message is a Registration Accept message.

6. A method by a User Equipment (UE) in a wireless communication system, the method comprising:
   determining whether to support a periodic registration timer indication;
   transmitting, to an Access and Mobility management Function (AMF), a first message including information indicating a capability for a periodic registration timer; and
   receiving, from the AMF, a second message including the periodic registration timer indication and a periodic registration timer value, wherein whether to support the periodic registration timer indication is identified based on the information, wherein a periodic registration timer is started after completion of Registration procedure based on the periodic registration timer indication and the periodic registration timer value in case that the periodic registration timer indication is provided, and wherein the periodic registration timer is restarted with applying the periodic registration timer indication in case that the periodic registration timer expires and the UE is in CONNECTED mode.

7. The method of claim 6,
wherein the periodic registration timer is started after transmitting the second message to the UE.

8. The method of claim 6, further comprising:
receiving, from the AMF, a third message including information for updating the periodic registration timer value and the periodic registration timer indication.

9. The method of claim 8, wherein the third message is a UE Configuration Update Command message.

10. The method of claim 6, wherein the second message is a Registration Accept message.

11. An Access and Mobility management Function (AMF) in a wireless communication system, the AMF comprising:
a transceiver; and
a controller configured to control the transceiver to:
receive, from a User Equipment (UE), a first message including information indicating a capability for a periodic registration timer indication,
identify whether the UE to supports the periodic registration timer indication based on the information in the first message,
transmit, to the UE, a second message including the periodic registration timer indication and a periodic registration timer value based on the identification,
start a periodic registration timer after completion of Registration procedure based on the periodic registration timer indication and the periodic registration timer value in case that the periodic registration timer indication is provided, and
restart the periodic registration timer with applying the periodic registration timer indication in case that the periodic registration timer expires and the UE is in CONNECTED mode.

12. The AMF of claim 11, wherein the controller is further configured to start the periodic registration timer after transmitting the second message to the UE.

13. The AMF of claim 11, wherein the controller is further configured to control the transceiver to transmit, to the UE, a third message including information for updating the periodic registration timer value and the periodic registration timer indication.

14. The AMF of claim 13, wherein the third message is a UE Configuration Update Command message.

15. The AMF of claim 11, wherein the second message is a Registration Accept message.

16. A User Equipment (UE) in a wireless communication system, the UE comprising:
a transceiver; and
a controller configured to control the transceiver to:
determine whether to support a periodic registration timer indication,
transmit, to an Access and Mobility management Function (AMF), a first message including information indicating a capability for a periodic registration timer, and
receive, from the AMF, a second message including the periodic registration timer indication and a periodic registration timer value,
wherein whether to support the periodic registration timer indication is identified based on the information,
wherein a periodic registration timer is started after completion of Registration procedure based on the periodic registration timer indication and the periodic registration timer value in case that the periodic registration timer indication is provided, and
wherein the periodic registration timer is restarted with applying the periodic registration timer indication in case that the periodic registration timer expires and the UE is in CONNECTED mode.

17. The UE of claim 16, wherein the periodic registration timer is started after transmitting the second message to the UE.

18. The UE of claim 16, wherein the controller is further configured to receive, from the AMF, a third message including information for updating the periodic registration timer value and the periodic registration timer indication.

19. The UE of claim 18, wherein the third message is a UE Configuration Update Command message.

20. The UE of claim 16, wherein the second message is a Registration Accept message.

* * * * *